United States Patent [19]
Mirtain

[11] 3,931,844
[45] Jan. 13, 1976

[54] CUSHIONED TREAD TIRE
[75] Inventor: Henri J. Mirtain, Compiegne, France
[73] Assignee: Uniroyal, S.A., Clairox, France
[22] Filed: May 14, 1973
[21] Appl. No.: 359,936

[52] U.S. Cl. ............. 152/360; 152/354; 152/361 R
[51] Int. Cl.² .......................................... B60C 9/18
[58] Field of Search ......... 152/209, 361 R, 361 FP, 152/361 DM, 360, 374, 353, 354

[56] References Cited
UNITED STATES PATENTS

| | | | |
|---|---|---|---|
| 1,254,884 | 1/1918 | Chinnock | 152/374 |
| 1,769,694 | 7/1930 | Jenkinson | 152/360 |
| 2,445,725 | 7/1948 | Walker | 152/374 |
| 3,392,774 | 7/1968 | Le Bosse | 152/361 R |
| 3,512,568 | 5/1970 | Delobelle | 152/361 R |
| 3,612,136 | 10/1971 | Gough | 152/361 |

FOREIGN PATENTS OR APPLICATIONS

| 1,290,231 | 3/1962 | France | 152/361 R |
|---|---|---|---|

Primary Examiner—Drayton E. Hoffman
Attorney, Agent, or Firm—Herbert A. Stern

[57] ABSTRACT

A radial ply pneumatic tire, characterized by uniform tread wear and improved traction is disclosed. The tire includes a radial ply carcass, first and second sidewalls overlying the lateral portions of the carcass, a tread overlying the crown region of the carcass, a breaker positioned between the tread and the crown region of the carcass, and a cushion positioned between the breaker and the tread. The cushion is constituted by a rubber mixture which is softer than the rubber mixture constituting the tread and it extends symmetrically about the median equatorial plane of the tire, thereby providing a more pliable support in the central portion of the tread than in the shoulder region thereof. This abstract is not to be taken either as a complete exposition or as a limitation of the present invention, however, the full nature and extent of the invention being discernible only by reference to and from the entire disclosure.

8 Claims, 3 Drawing Figures

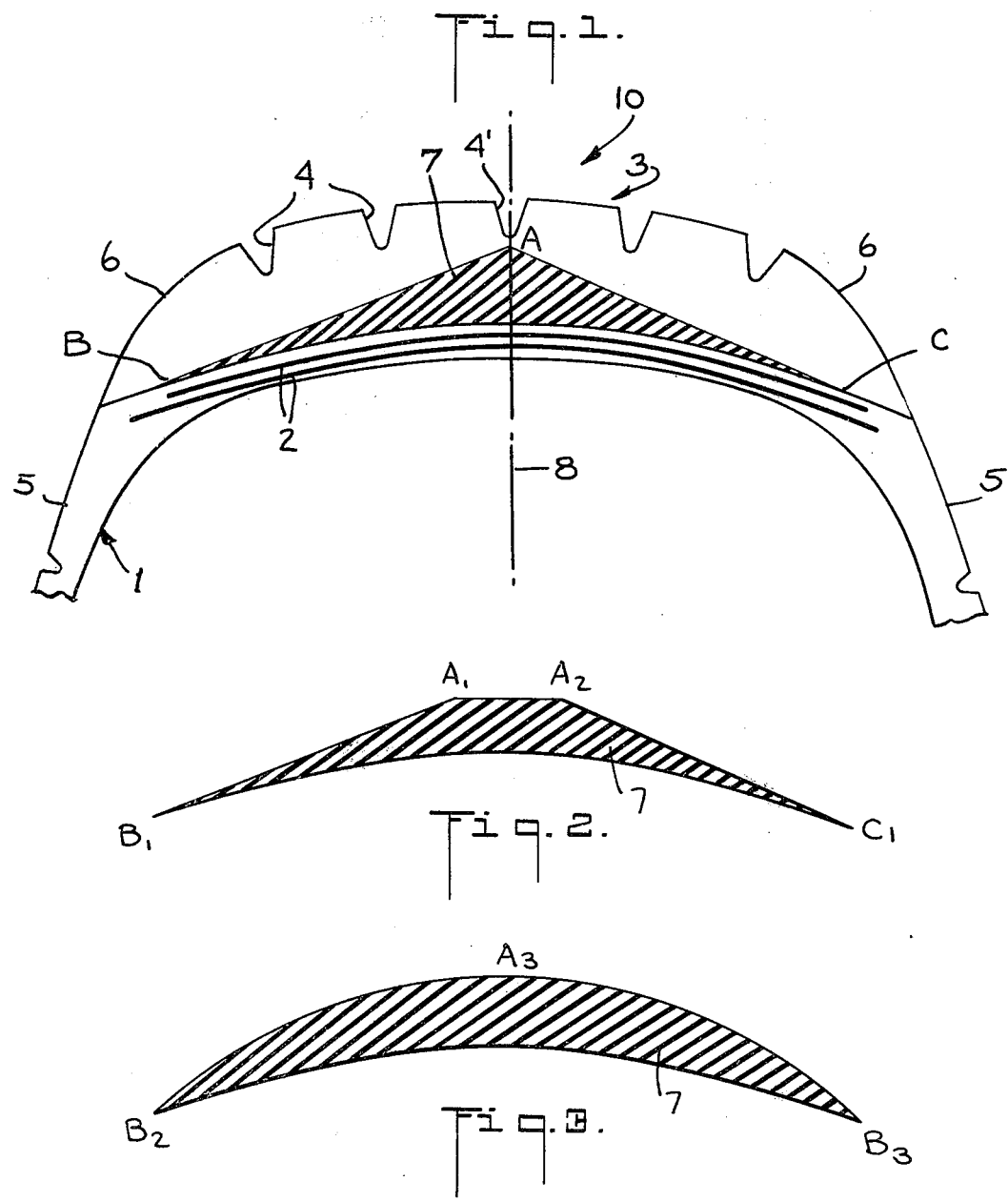

CUSHIONED TREAD TIRE

BACKGROUND OF THE INVENTION

This invention relates to radial ply pneumatic tires for vehicles and more particularly to such tires having inserts between the tread and carcass thereof.

The shoulders or lateral areas of tire treads presently known in the art tend to wear at a greater rate than the central portion of the tread. This necessitates the premature scrapping of such tires due to their total wear in the shoulder area although the central portion of the tread is still satisfactory for substantial additional service. The non-uniform distribution of tread wear is due in substantial measure to the severe conditions of service under which the tire mist operate. It is especially due to frequent sharp turns which cause complete wear in the shoulder area before comparable wear occurs in the central portion of the tread.

In an attempt to overcome the drawbacks in presently known tires it has been suggested, for example, that additional rubber be incorporated in the lateral area of the treads so that, notwithstanding the fact that this area of the tread wears more quickly than the central area thereof, both the central and lateral portions of the tread will wear out at approximately the same time. This solution however has undesirable side effects. For example, it causes an unwanted weight increase in the shoulder region which increases the heat build-up in the tire, thereby deleteriously affecting tire life. Further, increasing the quantity of material in the shoulder regions serves to increase the cost of manufacture of the tire. Another solution to the instant problem is disclosed in U.S. Pat. application Ser. No. 359,935 filed May 14, 1973, now U.S. Pat. No. 3,853,164 and assigned to the assignee of the instant invention. This application teaches the use of a cushion constituted by a material which is harder than the material from which the tread is constituted disposed between the tread and the breaker of the tire. The cushion extending to one or both of the lateral or outside walls of the tire. This solution also is not completely satisfactory because the use of such a hard cushion and has resulted in a ride quality which is substantially rougher than that of conventional tires. Further, it has been found that the use of such a hard cushion tends to reduce the traction of the tire, and is therefore potentially hazardous.

SUMMARY OF THE INVENTION

It is, therefore, an important object of the present invention to provide an improved radial ply tire construction by means of which the aforesaid drawbacks and disadvantages may be most efficaciously avoided.

It is a further object of this invention to provide a radial ply pneumatic tire in which the rate of wear in the tread shoulder is substantially the same as the rate of wear in the central portion of the tread.

Generally speaking the objectives of the present invention are attained by the provision of a pneumatic vehicle tire comprising a radial ply carcass, first and second sidewalls, overlying the lateral portions of the carcass, a tread overlying the crown region of the carcass, a breaker interposed between the tread and the crown region of the carcass in circumferentially surrounding the relation to the latter, and a cushion interposed between the breaker and the tread extending symmetrically about the median equatorial plane of the tire, the cushion being constituted by a material softer than the tread material, thereby providing a more pliable support in the central portion of the tread than in the shoulder region thereof.

BRIEF DESCRIPTION OF THE DRAWINGS

The foregoing and other objects of the invention will be more clearly understood from the following detailed description thereof when read in conjunction with the accompanying drawings, in which:

FIG. 1 illustrates a sectional axial view of a belted radial ply tire according to the invention; and FIGS. 2 and 3 illustrate sectional axial views of two alternative embodiments of the cushion according to the invention.

DESCRIPTION OF THE PREFERRED EMBODIMENT

Referring now to FIG. 1 there is illustrated a cross-sectional axial view of a tire 10 constructed according to the invention. The tire includes a carcass 1 of radial ply construction and two breakers or belts 2. Belts 2 are superposed one on the another and both are positioned between the crown region of the carcass and a tread 3 for reinforcing the latter. The tread 3 is formed with a plurality of traction grooves 4, in a manner customary in the art. Sidewalls 5 overlie the lateral portions of carcass 1 and tread 3 is joined to the sidewalls 5 in the region of the shoulder 6. The tread 3 is separated from the carcass 1 over a substantial portion of the axial width of the tire 10 by a cushion 7. For purposes of examples only the cushion 7 has been illustrated as extending from a point generally beneath one shoulder 6 to a point generally beneath the laterally opposite shoulder 6. This, however is not necessary and equally satisfactory results may be obtained if the cushion 7 extends a lesser distance to each side of the median equatorial plane 8 of the tire 10. The cushion 7 is configured so that, when seen in axial cross-section, it approximates a triangle, the apexes of which are indicated at A, B, and C. The radial thickness of cushion 7 varies in such a manner that it is a maximum at apex A, which lies in the median equatorial plane 8 of the tire 10, and it tapers to a minimum at apexes B and C.

Turning now to FIG. 2 where, as in FIG. 3 below, like numerals are utilized to indicate like portions of the inventive structure, there is illustrated an alternative embodiment of a cushion 7 which may be substituted for the cushion 7 illustrated in FIG. 1. Cushion 7 is here illustrated, in axial cross-section, as having a substantially trapezoidal configuration, the apexes of the trapezoid being indicated at $B_1$, $C_1$, $A_2$ and $A_1$. As was previously noted with regard to FIG. 1, here too the radially thickest portion of cushion 7, extending from apex $A_1$, to Apex $A_2$, lies in the median equatorial plane 8 of the tire and in this embodiment it extends a short distance to each side thereof. Further, the cushion 7 tapers to its minimal radial thickness at apexes $B_1$ and $C_1$ which correspond, in terms of both radial thickness and location relative to the lateral or outside walls of the tire, to apexes B and C in FIG. 1 respectively.

Turning now to FIG. 3 it will be seen there is illustrated another alternative embodiment of a cushion 7 which may be substituted for the cushion 7 illustrated in FIG. 1. Cushion 7 is here illustrated, in axial cross-section, as having a substantially crescent-like configuration, the apexes of the crescent being indicated at $B_2$ and $B_3$. Here too, as was previously noted with respect to both FIGS. 1 and 2, the region of maximum radial thickness of cushion 7 is located symmetrically about the median equatorial plane 8 of the tire 10, this region being indicated at $A_3$. The cushion 7 tapers of its minimal radial thickness at the points indicated at $B_2$ and $B_3$ which correspond generally, in terms of both radial thickness and location relative to the lateral or outside walls of the tire, to apexes B and C of FIG. 1 respectively.

It is noted that each of three illustrated cushions 7 are contoured to have curvilinear base, the bases being indicated at B-C in FIG. 1, $B_1$-$C_1$ in FIG. 2 and $B_2$-$C_3$ in FIG. 3. Further, each of the curvilinear bases are convex in a radially outward direction, i.e., toward the tire tread. The sides of the three cushions, these sides being indicated at A-B, and A-C in FIG. 1, $A_1$-$B_1$ and $A_2$-$C_1$ in FIG. 2 and $A_3$-$B_2$ and $A_3$-$B_3$ in FIG. 3 may be either rectilinear or curvilinear, and, if curvilinear, may be either concave or convex in the radially outward direction.

As illustrated in FIGS. 1–3, cushion 7 provides a seat or base for tread 3 and it is formed of a rubber compound which is substantially softer and more supple than the rubber constituting tread 3. Because the radially thickest portion of the cushion is located in or symmetrically about the median equatorial plane 8 of the tire 10, the central portion of the tread is less stiffly supported than the sidewall region thereof, and this tends to cause the shoulder regions of the tread and the central portion thereof to wear at generally equal rates. For purposes of illustrating the relative hardness of the tread with respect to the hardness of the cushion, it has been found advantageous to construct the tread from a rubber mixture containing approximately 90% natural rubber, 10% butadiene rubber, 90% carbon black and 5% sulphur thus providing a tread having a hardness of 85 to 88 Shore A units while the cushion is made from a rubber having a Shore A hardness of 58 to 62.

It has been discovered that the soft rubber cushion disclosed herein, positioned between the tread and breakers of the tire 10, results in improved traction of the tire while it is in service. This is believed to be due to the fact that the central portion of the tread has been provided with a relatively more supple or flexible seat than the shoulders of the tread, thereby causing the central portion of the tread to have a greater resilience. The configuration illustrated in FIG. 1 has also been discovered to provide improved traction in another manner. As is well known in the prior art, attempts have been made to overcome the transverse drift effected caused by a sudden loss of traction due to the effects of centrifugal force in sharp curves by articulating or hinging a tire in its median equatorial plane. This is customarily accomplished by forming a tread groove in the median equatorial plane of the tire and making the breakers of the tire in two equal annular portions, one portion placed on each side of the median equatorial plane. The same hinged effect has been here more simply and economically acheived solely by forming a tread groove, indicated at 4', in the plane 8, it being clear that the tire 10 will be effectively articulated in its median equatorial plane 8 due to the influence of apex A of cushion 7 which lies in the plane 8 and near the bottom of groove 4'. Thus it is seen that the requirement that the tire breakers be formed by two equal annular portions has been obviated.

It will be understood that the foregoing description of the preferred embodiments of the invention is for purposes of illustration only, and that the various structural and operational features as herein disclosed are susceptible to a number of modifications and changes, none of which entail any departure from the spirit and scope of the present invention as defined by the hereto appended claims.

Having thus described the invention, what is claimed and desired to be protected by Letters Patent is:

1. A pneumatic vehicle tire comprising:
    a radial ply carcass;
    first and second sidewalls overlying the lateral portions of said carcass;
    a tread constituted by a rubber compound overlying the crown region of said carcass;
    a breaker interposed between said tread and said crown region of said carcass in circumferentially surrounding relation to the latter; and
    a cushion constituted by a rubber compoung interposed between said breaker and said tread and extending symmetrically about the median equatorial plane of the tire,
    the radial thickness of said cushion being a maximum in the area of the median equatorial plane of the tire and tapering to a minimum in the shoulder region of said tread,
    the rubber of said cushion being softer than the rubber of said tread material, thereby providing a more pliable support in the central portion of the tread than in the shoulder region thereof.

2. A pneumatic vehicle tire according to claim 1, wherein said cushion is configured, in axial cross-section, as a triangle, one apex of which lies in the median equatorial plane of the tire and the two remaining apexes of which lie generally radially inwardly of the two shoulders of said tread.

3. A pneumatic vehicle tire according to claim 2, wherein said one apex liess adjacent said tread and said two remaining apexes lie adjacent said breaker.

4. A pneumatic vehicle tire according to claim 1, wherein said cushion is configured, in axial cross-section, as a trapezoid, the two apexes of the short side of said trapezoid being positioned symmetrically about said median equatorial plane and the two apexes of the long side of said trapezoid being positioned generally radially inwardly of the two shoulders of said tread.

5. A pneumatic vehicle tire according to claim 4, wherein the two apexes of the short side lie adjacent said tread and the two apexes of the long side lie adjacent said breaker.

6. A pneumatic vehicle tire according to claim 1, wherein said cushion is configured, in axial cross-section, as a crescent, the two apexes of which lie generally radially inwardly of the two shoulders of said tread.

7. A pneumatic vehicle tire according to claim 6, wherein said two apexes are positioned adjacent to said breaker.

8. A pneumatic vehicle tire according to claim 1, wherein the rubber compound constituted said tread has a hardness rating of between about 85 and about 88 Shore A units and the rubber compounding constituting said cushion has a hardness rating of between about 58 and about 62 Shore A units.

* * * * *

UNITED STATES PATENT AND TRADEMARK OFFICE
CERTIFICATE OF CORRECTION

PATENT NO. : 3,931,844
DATED : January 13, 1976
INVENTOR(S) : Henri J. Mirtain

It is certified that error appears in the above-identified patent and that said Letters Patent are hereby corrected as shown below:

Column 1, line 16, delete "mist" and substitute --must-- therefor; line 40, delete ". The" and substitute --, the-- therefor; line 43, delete "and"; line 62, delete ","; line 66, delete "the", first occurrence.

Column 3, line 10, after "of" insert --the--; line 11, after "have" insert --a--.

Claim 1, line 10, delete "compoung" and substitute --compound-- therefor.

Claim 3, line 2, delete "liess" and substitute --lies-- therefor.

Claim 8, line 2, delete "constituted" and substitute --constituting-- therefor.

Signed and Sealed this

Thirteenth Day of July 1976

[SEAL]

Attest:

RUTH C. MASON
*Attesting Officer*

C. MARSHALL DANN
*Commissioner of Patents and Trademarks*